United States Patent
Asaad et al.

(10) Patent No.: US 7,051,186 B2
(45) Date of Patent: May 23, 2006

(54) SELECTIVE BYPASSING OF A MULTI-PORT REGISTER FILE

(75) Inventors: Sameh Asaad, Briarcliff Manor, NY (US); Jaime H. Moreno, Dobbs Ferry, NY (US); Victor Zyuban, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 10/230,492

(22) Filed: Aug. 29, 2002

(65) Prior Publication Data

US 2004/0044882 A1   Mar. 4, 2004

(51) Int. Cl.
G06F 15/82 (2006.01)
G06F 9/305 (2006.01)

(52) U.S. Cl. .......................... 712/22; 712/201
(58) Field of Classification Search .......... 712/22, 712/25, 201, 215; 711/131; 710/305, 316
See application file for complete search history.

(56) References Cited

U.S. PATENT DOCUMENTS

| | | | | |
|---|---|---|---|---|
| 5,471,593 A | * | 11/1995 | Branigin | 712/235 |
| 5,799,163 A | * | 8/1998 | Park et al. | 712/205 |
| 6,092,184 A | * | 7/2000 | Wechsler | 712/218 |
| 6,668,316 B1 | * | 12/2003 | Gorshtein et al. | 712/221 |

* cited by examiner

*Primary Examiner*—Daniel Pan
(74) *Attorney, Agent, or Firm*—Robert M. Trepp; F. Chau & Associates, LLC

(57) ABSTRACT

A multi-port register file may be selectively bypassed such that any element in a result vector is bypassed to the same index of an input vector of a succeeding operation when the element is requested in the succeeding operation in the same index as it was generated. Alternatively, the results to be placed in a register file may be bypassed to a succeeding operation when the N elements that dynamically compose a vector are requested as inputs to the next operation exactly in the same order as they were generated. That is, for the purposes of bypassing, the N vector elements are treated as a single entity. Similar rules apply for the write-through path.

6 Claims, 5 Drawing Sheets

SELECTIVE BYPASSING OF A MULTI-PORT REGISTER FILE

BACKGROUND OF THE INVENTION

1. Field of the Invention

The present invention relates generally to processor architecture, and more particularly to techniques for selective bypassing of a multi-port register file.

2. Background of the Invention

To improve performance, contemporary processors often employ pipelining techniques to execute instructions at very high speeds. On such processors, instruction processing is divided into a sequence of operations, and each operation is performed in a corresponding pipeline stage. Independent operations from several instructions may be processed simultaneously by different pipeline stages, increasing the instruction throughput of the processor. A typical instruction pipeline in a microprocessor includes the following pipeline stages: Instruction Fetch (IF), Decode (Dec), Data Read (RD), Execute (EX), and Write (WR).

Referring to FIG. 1, a multi-operation microprocessor organization is illustrated. As depicted, the multi-operation microprocessor includes a two functional unit (FU) architecture with a four read port (R1–R4), two write port (W1, W2) register file (150). It should be appreciated that while a two functional unit architecture is shown, the actual number of FUs for this type of a processor could be more than the number shown. Furthermore, it is to be understood that although there are many designs for multi-operation microprocessors, the ones presented here allow the data elements to be independently accessed from a register file, that is, using independent indexes into the register file.

When the operations performed in the EX stage are specified independently, that is by separate instructions, the microprocessor organization is known as superscalar. In contrast, when the operations are specified by a single instruction that operates on multiple data elements, the microprocessor organization is known as single-instruction multiple-data (SIMD)

During the RD stage (110), four data elements are read simultaneously from the multi-port register file (150) and grouped into two separate sets, with two elements each. Herein, these sets of elements are known as vectors.

During the EX stage (120), two parallel functional units (140, 142) perform an arithmetic or logic operation on the two data vectors. At the WR stage (130), the results generated in the functional units (140, 142) are grouped into a result vector and written back to the register file (150).

SUMMARY OF THE INVENTION

According to various embodiments of the present invention, a register file of the type that allows dynamic vector composition may be selectively bypassed such that any element in a result vector is bypassed to an input vector of a succeeding operation when the element is requested in the succeeding operation in the same element position as it was generated. Alternatively, the results to be placed in a register file may be bypassed to a succeeding operation when the N elements that dynamically compose a vector are requested as inputs to the next operation exactly in the same order as they were generated. That is, for the purposes of bypassing, the N vector elements are treated as a single entity. Similar rules apply for the write-through path.

DETAILED DESCRIPTION OF PREFERRED EMBODIMENTS

To allow uninterrupted (i.e., back-go-back) execution on vector data where the result of the operation at cycle i is used as input to the operation at cyle i+1 (bypass) or the operation at cycle i+2 (write-through), bypasses from the output of the EX and WR stages may be fed back and multiplexed with the output of the RD stage. A full bypass architecture allows any element of a result vector to be bypassed to, any element in any of the two input operand vectors.

Figure 1:
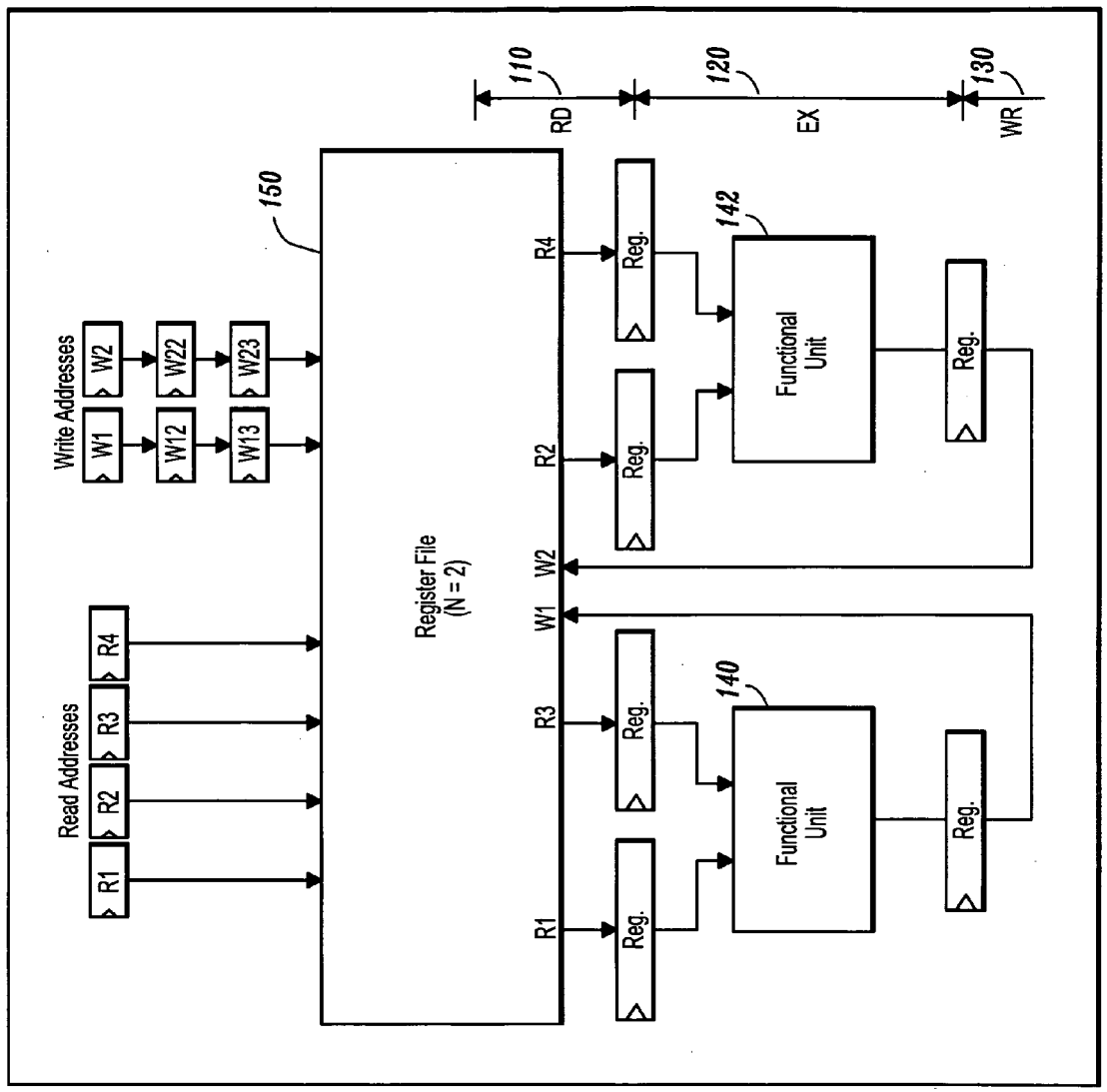
FIG. 1 illustrates a pipeline for a multi-operation architecture without bypassing.
Figure 2:
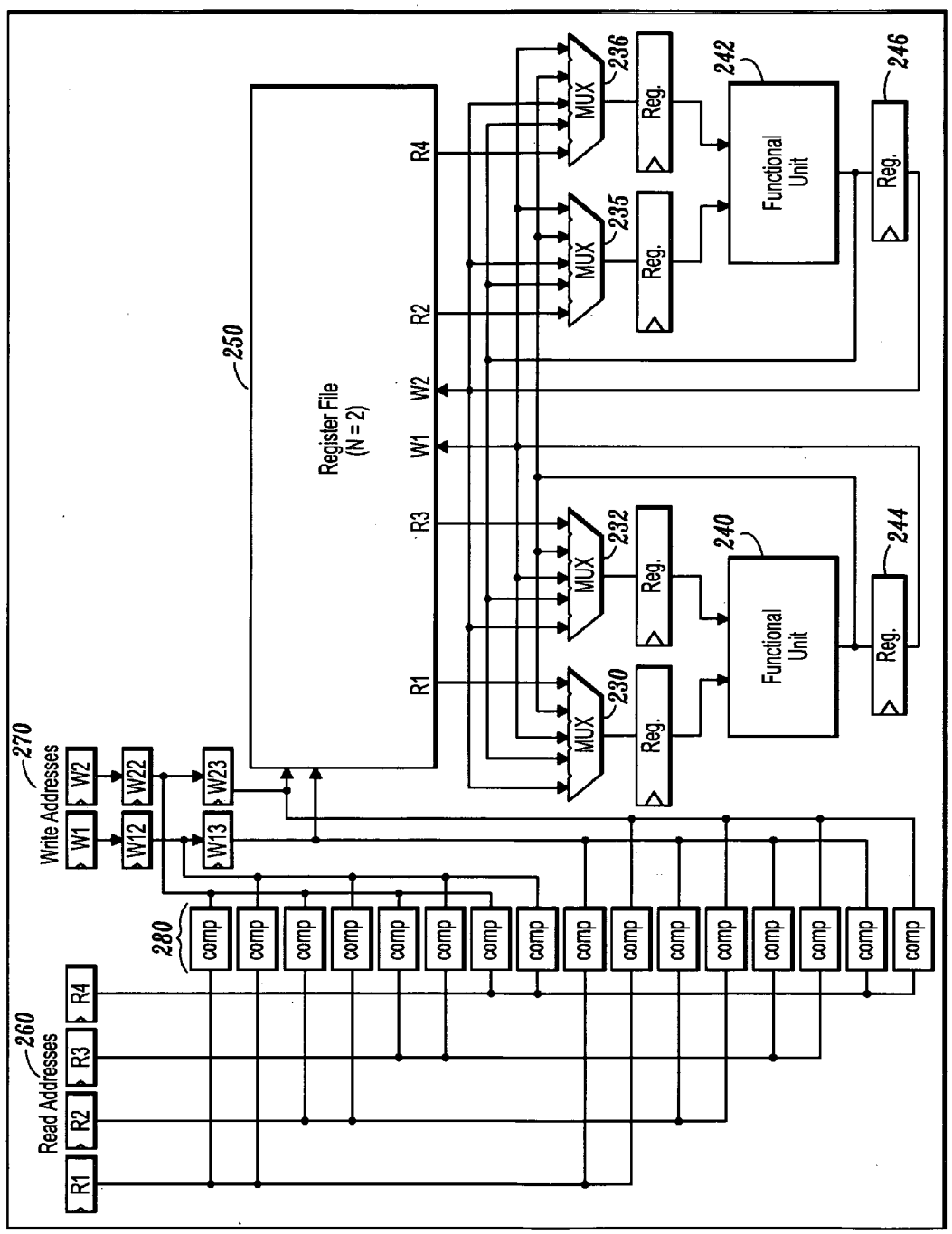
FIG. 2 illustrates a pipeline for a multi-operation architecture with full bypassing.

A pipeline with full bypasses is shown in FIG. 2. During the RD stage, four data elements are read either from a multi-port register file (250), the output of functional units (240, 242), or the output of write stage registers (244, 246). For each read index (260) pointing to a single element, a plurality of comparators (280) are utilized to make comparisons with element write indexes (270). If a read index matches any of the write indexes of the last cycle, the data element is read from the corresponding element output of the corresponding functional unit. If there is no match, a comparison is then made with the element write indexes of the second to last cycle. If the read index matches any of these write indexes, the data element is read from the corresponding element output of the corresponding WR stage latch. In the case where the read index doesn't match any of the write indexes, then the data element is simply read from the register file entry of the corresponding read index. Though the connections are not explicitly shown, it is to be understood that comparison results are used by the multiplexers (230–236).

During the EX stage, two parallel functional units (240, 242) each perform an operation on the two input vectors, each unit operating on a pair of elements, one from each input vector. The result of the operation is latched into the WR stage latches and also made available to the bypass multiplexers (230–236) for immediate use by the following instruction, if needed. At the WR stage, the result vector is written back to the Register File 250 and also made available to the bypass multiplexers (230–236) for immediate use by the following instruction, if needed.

For an N-element wide vector architecture with a register file having $2^M$ entries each W bits wide, this involves 2N data multiplexers, each having 2N+1 W-bit inputs, and $4N^2$ address comparators, each comparing M-bit read addresses to M-bit write addresses, in addition to the overhead in wiring. The overhead of full bypassing grows proportional to the square of N (number of elements per vector). This represents a significant problem in terms of silicon area, power consumption and timing.

The present invention has been made to alleviate these problems by observing that most of the bypassed vector results are used in the following operations in the same element position as they were produced. For example, vector accumulation repeatedly adds N new elements to the running N-element sum, whereby the element position of the running sum is preserved from cycle to cycle.

One way to exploit this observation is to define a selective bypassing structure such that any element in the result vector is bypassed to the vector of a succeeding operation if and only if the element is requested in the succeeding operation in the same position as it was generated. A similar rule applies for the write-through path.

Figure 3:
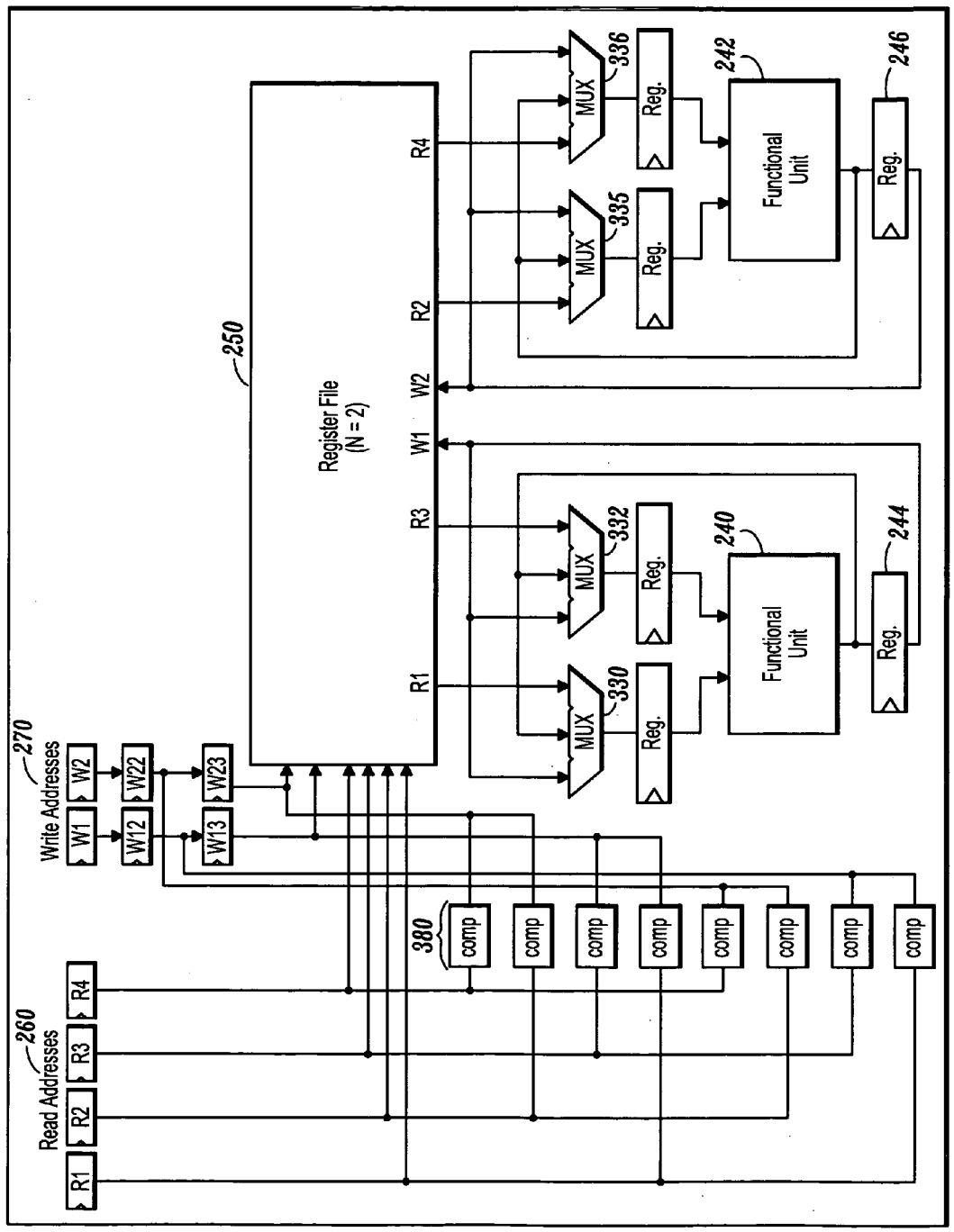
FIG. 3 illustrates a pipeline for a multi-operation architecture with same-position selective bypassing.

FIG. 3 illustrates an arrangement for the same-position selective bypassing scheme. During the RD stage, 2N data elements are read either from the multi-port register file (250), the output of the Functional Units (240, 242) or the output of the WR stage registers (244, 246) according to the following rules:

```
for each element read index i in 1 thru N {
if the element read index matches the element write
    index of the last cycle {
        read the data element from the output of the
        Functional Unit
    }
else if the element read index matches the element
    write index of the second to last cycle {
        read the data element from the output of
        the WR stage latch
    }
    else {
        read the data element from the register
        file entry of the corresponding read index
    }
}
```

During the EX stage, N parallel functional units perform an operation on the two input vectors, each unit operating on a pair of elements, one from each input vector. At the WR stage, the result vector is written back to the register file (250) and also made available to the bypass multiplexers (230–236) feeding the same functional unit for immediate use by the following instruction, if needed.

As shown in FIG. 3, for a two-element architecture, this same-position selective bypassing scheme employs eight address comparators (380) instead of sixteen comparators. In general, same-position selective bypassing scheme requires 4N address comparators.

Another way to exploit the observation is to define a selective bypassing structure such that the results to be placed in the register file are bypassed to a succeeding operation if and only if the N elements that dynamically compose a vector are requested as inputs to the next operation exactly in the same order as they were generated. That is, for the purposes of bypassing, the N vector elements are treated as a single entity. A similar rule applies for the write-through path.

Figure 4:
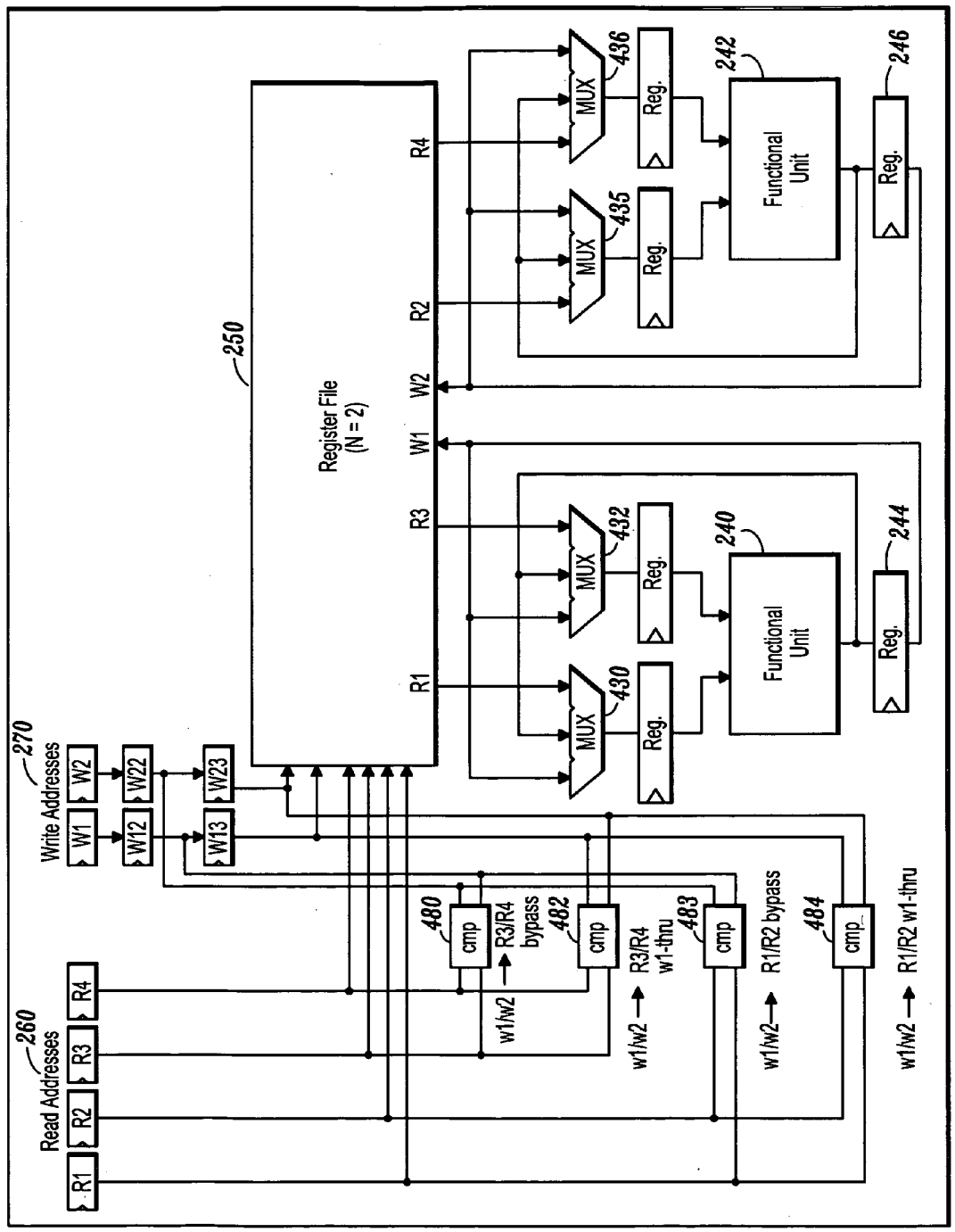
FIG. 4 illustrates a pipeline for a multi-operation pipeline with all-or-none selective bypassing.

FIG. 4 illustrates an arrangement for the all-or-none selective bypassing scheme. During the RD stage, 2N data elements are read either from the multi-port register file (250), the output of the Functional Units (240, 242) or the output of the WR stage registers (244, 246) according to the following rules:

```
1.  Form two vector read indices. Each vector read index
is formed by concatenating the element read indices of each
of the N elements in the vector together.
2.  Form one vector write index by concatenating the
element write indices of each of the N elements in the
result vector together.
3.  for each vector read index {
        if the vector read index matches the vector write
            index of the last cycle {
                read the data vector from the output of the
                    Functional Units preserving element order
            }
        else if the vector read index matches the vector
            write index of the second to last cycle {
                read the data vector from the output of the
                    WR stage latches preserving element order
            }
            else {
                read the data vector from the register file
                    entries of the corresponding element
                    read indices
            }
    }
```

During the EX stage, N parallel functional units perform the an operation on the two input vectors, each unit operating on a pair of elements, one from each input vector. The result of the operation is latched into the WR stage latches and also made available to the bypass multiplexers feeding the same functional unit for immediate use by the following instruction, if needed. At the WR stage, the result vector is written back to the RF and also made available to the bypass multiplexers, (430–436) feeding the same functional unit for immediate use by the following instruction, if needed.

As shown in FIG. 4, for a two-element architecture, this all-or-nothing selective bypassing scheme employs only four comparators (480–484). In general, all-or-nothing selective bypassing requires 2N comparators, and reduces the bypassing overhead of 2N data multiplexers, each having 3 W-bit inputs, and 4 address comparators, each comparing M*N concatenated read addresses to M*N concatenated write addresses.

Figure 5:
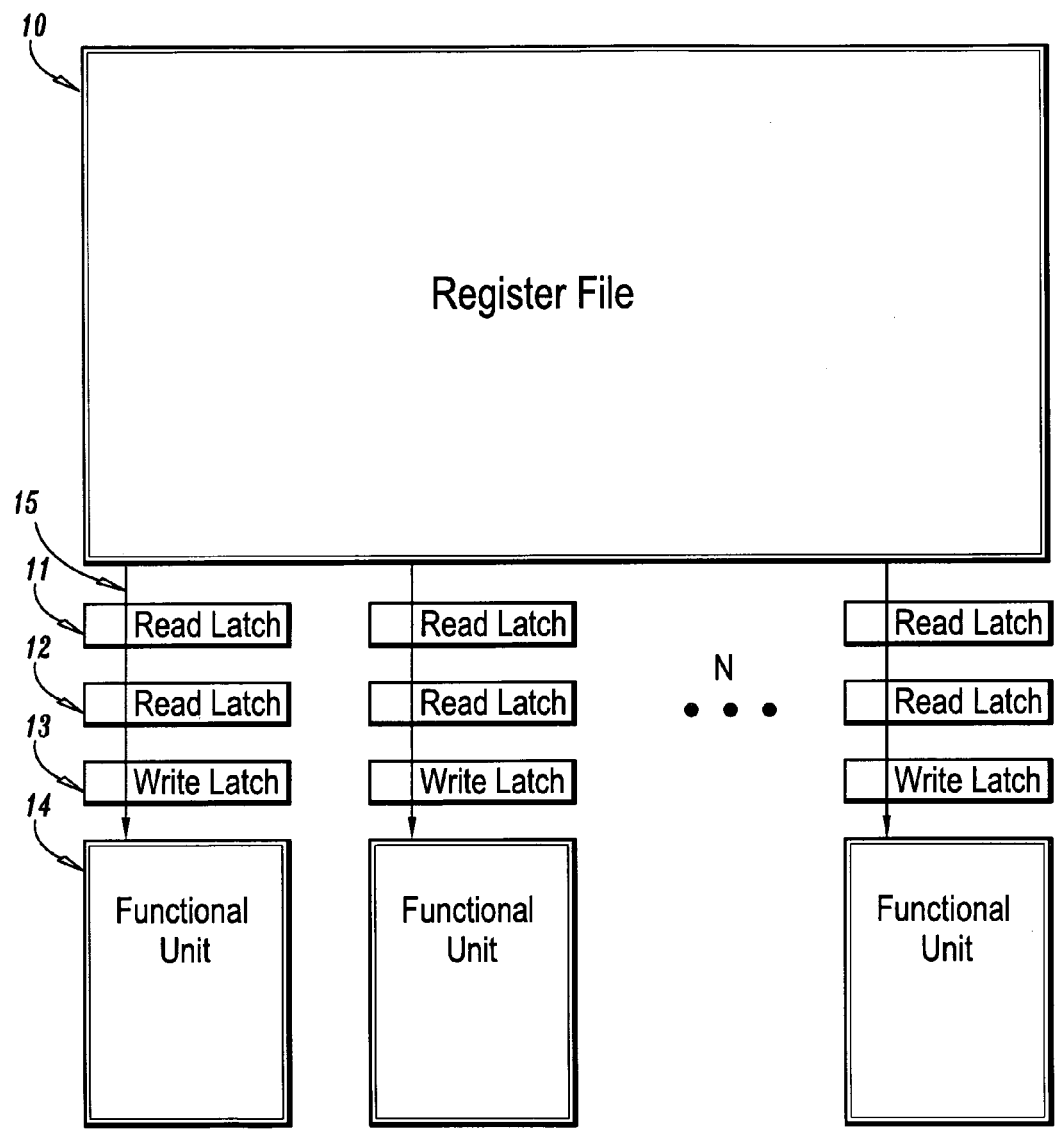
FIG. 5 illustrates a floorplan of functional units with selective bypass.

FIG. 5 shows a preferred floorplan of functional units with selective bypass. Both read and write latches are physically placed on top of the corresponding sections of the datapath. All bypass wires run vertically from inputs and outputs to the write-back latch, through the bypass multiplexer to the inputs of the read latches. There are no wires running across the functional units.

As depicted in FIG. 5, a selective bypass mechanism can be physically implemented on a chip to fully take advantage of the present invention. In particular, the preferred floorplan includes a multi-ported register file 10 and N functional units 14 that use the selective bypass mechanism. Read latches 11 and 12 hold values read from the register file 10, and write latches 13 hold values to be written into the register file 10 in the next cycle. There are at least two read latches and one write latch for each functional unit.

In the preferred floorplan of FIG. 5, both the read latches 11 and 12, and the write latch 13, of the same functional unit 14, are physically placed between the register file and that functional unit, physically close to each other. As a result, all bypass wires 15 run vertically from inputs and outputs of the write latch 13 to the inputs of bypass multiplexors that can be embedded into the read latches 11 and 12. In this physical implementation there are no wires running across the unit.

It should be appreciated that the selective bypass may be used in SIMD microprocessors, as well as in multi-operation microprocessors wherein the instructions are scheduled either statically (when the code is generated) or dynamically (while the code is being executed).

In SIMD microprocessors, the selective bypass mechanism is defined as part of the architectural specification of the microprocessor. If dependent operations are issued in consecutive cycles, an optimizing compiler or the programmer ensures that dependent individual operations of the SIMD instructions are executed in the same functional unit, that is, in the same position of the vectors.

In statically scheduled pipelined processors, the selective bypass mechanism is also defined as part of the architectural specification of the microprocessor. If dependent instructions are issued in consecutive cycles, an optimizing compiler or a programmer schedules them to be executed in the same functional unit, that is, in the same position of the vectors.

In dynamically scheduled processors, the selective bypass mechanism is not visible to the compiler or programmer. Instead, the instructions issue mechanism is built to issue dependent instructions taking into account the properties of the limited bypass. If dependent instructions are issued for execution in consecutive cycles, the issue logic sends them to the same functional unit, that is, in the same position of the vectors.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. In a multi-operation processing system having a multi-stage execution pipeline, including a plurality of functional units and a register file having a plurality of read ports and write ports, a method for selectively bypassing the register file, comprising the steps of:
   determining whether results produced simultaneously in the functional units are to be used in the same functional units where the results were produced; and
   bypassing the register file, when the results are to be used in the same functional units where the results were produced, wherein the determining step comprises the steps of:
   forming a pair of vector read indexes, each vector read index formed by concatenating read indexes of each operand;
   forming a vector write index by concatenating the write indexes of each result;
   comparing each of the vector read indexes to the vector write index; and
   for each of the comparisons, setting a single bypass condition for all the functional units, if the result of the comparison is a match.

2. The method of claim 1, wherein the determining step comprises, for each of the functional units, comparing each operand read index to a corresponding result write index for a previous cycle and setting a bypass condition for the functional unit, if the result of the comparison is a match.

3. The method of claim 1, wherein the processing system is a single-instruction multiple-data (SIMD) processing system.

4. The method of claim 1, wherein the processing system is a statically scheduled multiple issue processing system.

5. The method of claim 1, wherein the processing system is a dynamically scheduled multiple issue processing system.

6. A floorplan for a portion of an integrated circuit chip, the integrated circuit chip capable of implementing the method of claim 1, comprising:
   a layout including areas of the chip for a multi-port register file, a plurality of functional units, and a plurality of read latches and write latches;
   wherein each of the functional units has at least two read latches for holding values from the multi-port register file and a write latch for holding a value to be written into the multi-port register file and the at least two read latches and the write latch for each of the functional units are placed between the register file and the functional unit such that bypass wires run from inputs and outputs of the write latch to inputs of the at least two read latches.

* * * * *